Patented Aug. 19, 1930

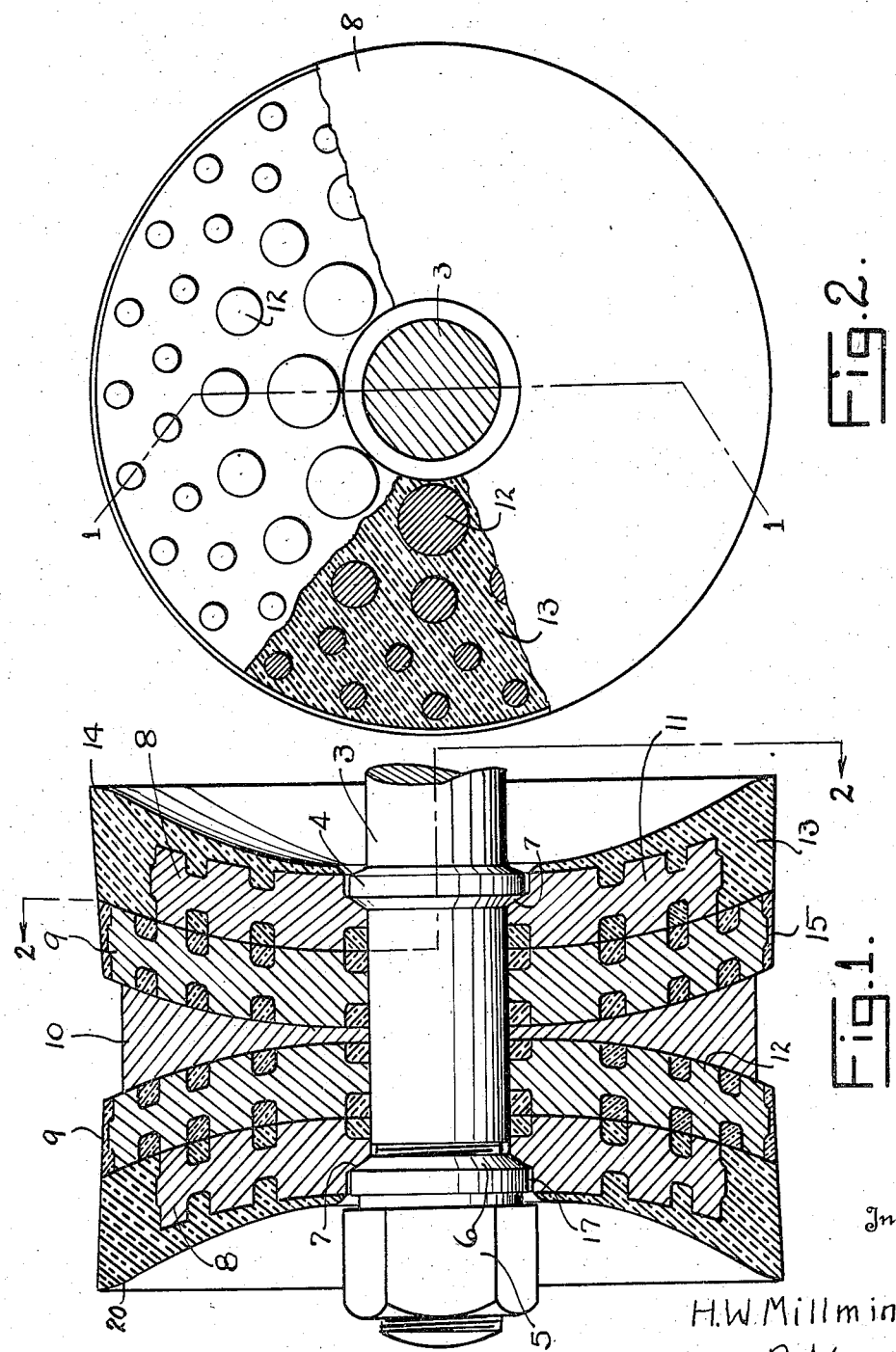

1,773,629

UNITED STATES PATENT OFFICE

HERBERT W. MILLMINE, OF HOUSTON, TEXAS

PUMP PISTON

Application filed September 20, 1929. Serial No. 393,861.

My invention relates to pump pistons and more particularly to pump pistons such as are used in slush pumps and the like in well drilling or similar operations. It is adapted for use in single or double acting pumps in which heavy pressures are sometimes necessary.

It is an object of my invention to provide a pump piston which will be of strong and sturdy construction adapted to work under heavy pressures and which will make a close seal with the wall of the pump liner for a long period of time.

I also desire to form a pump piston which is adapted to be expanded on the advancing end thereof thru the fluid pressures against which the piston operates.

My pump piston is also adapted to be made cheaply so that it can be used economically in the art and is so arranged that it may be easily repaired when desired.

It is also an object to provide a pump piston of the character which is made and assembled in separate parts so that one part may be renewed without the necessity of renewing other parts of the piston.

Other objects closely related to those already enumerated will more clearly appear in the detailed description which follows.

Referring to the drawing herewith, Fig. 1 is a central longitudinal section thru a piston pump employing my invention and taken on the line 1—1 of Fig. 2.

Fig. 2 is a transverse section taken approximately on the plane 2—2 of Fig. 1 and part of this view being in section for greater clearness.

I contemplate providing a piston pump the parts of which may be assembled directly upon the piston rod, which is drawn in Fig. 1 at 3. Said piston rod may be of cylindrical formation, having thereon and spaced from the end a ring or flange 4 serving as a stop member against which the parts of the piston may bear. The outer end of the piston rod is threaded to receive a nut 5 adapted to clamp a number of the packing discs or members upon the rod. The inner end of said nut 5 and the flange 4 have tapered bearing faces 6 thereon to fit within a tapered seat 7 in each of the outer plates of the piston. This seat tends to center the plates or disc with respect to the rod if they fit loosely.

The piston body is made up of a plurality of convexo-concave discs adapted to fit together to make up a packing member to fit within the pump cylinder. I have shown the each discs 8, at each end of the piston. These discs are of identical construction, and are shown as being concaved or dished toward the ends to have a saucer like form. Adjacent the two end discs are the two intermediate discs 9, said discs 9 being also convexo-concave and identical in construction. Between the two intermediate discs 9 is a concavo-concave ring 10 adapted to interfit with and support the two adjacent discs 9.

The discs 8 at each end of the piston are made up of a rigid reenforcing body or plate 11 which may be of iron or steel or even of hard rubber or other material adapted to maintain its shape and resist the strain to which it is subjected. The plate 11 is of smaller diameter than the body of the piston and the forward and rear faces of the plate are formed with short studs or bosses 12 thereon spaced upon the face of the disc or plate as shown in Fig. 2. The outer ends of the bosses may conform to the curvature of the plate or they may be formed perpendicular to the axis of the disc for simplicity in constructing the dies.

The bosses adjacent the center of the plate are shown as larger than those towards the margin. These bosses or studs may be spaced apart in any desired configuration or arrangement but preferably at a proper distance to provide between them a space in which a rubber body 13 may be molded. It is also desired to so arrange the bosses so that regardless of the position in which two of the discs may be assembled there will always be several of the bosses which will come in contact with the bosses of the next plate and serve to space the plate apart.

As will be understood from Figure 1, the rubber portion 13 entirely surrounds the plate 11 and extends beyond the periphery. On the outer side towards the end of the piston, the rubber portion is of sufficient depth to entirely conceal the plate while on the inside adjacent to the plate 9 the studs 12 come flush with the rubber body. The outer periphery of the rubber forming the disc 8 is curved outwardly so as to be oversize and to form a lip 14 which may be compressed somewhat by the cylinder wall when the piston is in position. This lip 14 is shown as formed with a reverse curve at 20. In this manner sufficient material is present to provide a substantial body portion to withstand the high pressure of the pump. The idea of placing a reverse or ogee curve on the face of the piston ring is old in the art and is illustrated in the expired patent to Luton No. 289,776, issued December 14, 1883.

The inner discs 9 are also convexo-concave with their end faces adapted to fit against the plates or discs 8, the inner sides of these discs being convex as may be seen in Figure 1. The plates 9 are provided with projecting bosses 12 thereon as shown in Fig. 2 and around these bosses the rubber packing member or body is molded, the rubber coming flush with the ends of the bosses on the forward and rearward sides. The outer periphery of each of these plates is also surrounded by a liner or rubber of similar composition as shown at 15 which may or may not be a portion of the rubber 13.

Two pairs of discs 8 and 9 are placed upon the piston rod and faced in opposite directions to form the piston and comprise the packing portion thereof. To assist in spacing the inner discs 9 apart and to take up the end thrust due to the pumping pressures, I have placed a spacing ring 10 of rigid material between the two discs 9. This spacing ring is shown as formed to fit the adjacent faces of the two discs 9 and is preferably of smaller diameter than either of the said discs. The outer surface of spacing ring is therefore spaced from the wall of the cylinder liner so that no scoring of a liner may take place. I do not contemplate placing any rubber on this spacing ring but its periphery might be covered if desired should it be made of sufficient diameter to engage the cylinder liner.

In assembling my piston upon the piston rod 3 the separate saucers or discs are set in the position shown in Fig. 1 upon the rod, the inner plate abutting against the ring or flange 4. The nut 5 is screwed in position on the end of the rod and the forward end is received within the recess 7 in the outer plate 8 and will clamp the parts firmly in position so that no relative movement of the separate discs may take place.

In operation the lips 14 or end of plates will be compressed slightly when the piston is inserted within the liner and there will be a resilient pressure at each end of the piston bearing against the cylinder and as the piston is reciprocated the advancing end of the piston will be acted upon by the fluid pressures developed in the pump and such pressure will assist in moving the lips 14 against the wall of the liner and will assure a tight seal between the piston and liner at all times.

The advantages of my construction lie in the fact that the piston is of strong construction adapted to withstand heavy pressures in both directions because the flexible material is adequately reenforced and bonded to the metal; and also that the parts may be easily removed and replaced. If one portion of the piston is damaged only that portion or disc need to be replaced and the cost of the upkeep is materially less than in pistons where the whole piston head must be discarded when a portion becomes worn. It will be seen that there will be a metal to metal contact by means of the bosses between the plates making up my piston throughout the length of the piston and the strain upon the rubber will be greatly relieved and liability to damage will be decreased. The contacting bosses will also allow the nut 5 to be drawn up securely on the rod to retain the discs in position and prevent any vibration of the metal reenforcing plates.

While I have shown and described the piston as made up of four discs or saucers and the spacing ring 10 it seems obvious that for various purposes the piston may be assembled with two discs 9 and the spacer ring, or two discs 8 and the ring. Also the spacing ring may be dispensed with and the discs backed together for a double acting piston. If a single acting piston is desired, one, two or more of the discs may be used all facing in the same direction. The essential feature of the invention being the individual saucer or disc a plurality of which may be combined or assembled as desired.

Having described my invention what I desire to secure by Letters Patent is:—

1. A pump piston adapted to be secured upon a piston rod including a plurality of sets of plates of rigid material concaved toward the adjacent end of the piston, and a covering of compressible material on said plates enclosing the periphery thereof to form a seal with the cylinder walls.

2. A pump piston adapted to be secured upon a piston rod including a plurality of sets of plates of rigid material at each end of said piston, said plates being concaved toward the adjacent end of the piston, and a covering of compressible material on said plates enclosing the periphery thereof to form a seal with the cylinder walls.

3. A pump piston adapted to be secured upon a piston rod including a plurality of sets of plates of rigid material concaved toward the adjacent end of the piston, said plates being formed with short studs thereon contacting with adjacent plates to take up end thrust on said piston, and a covering of compressible material on said plates enclosing the periphery thereof to form a seal with the cylinder walls.

4. A pump piston adapted to be secured upon a piston rod including a plurality of sets of plates of rigid material at each end of said piston, said plates being concaved toward the adjacent end of the piston, said plates being formed with short studs thereon contacting with adjacent plates to take up end thrust on said piston, and a covering of compressible material on said plates enclosing the periphery thereof to form a seal with the cylinder walls.

5. A pump piston including a piston rod, plates at each end of the piston concaved toward the adjacent end thereof, studs on said plates adapted to contact with adjacent plates, a covering of rubber molded about said plates between said studs, and means to clamp said plates upon said rod.

6. A pump piston including a piston rod, plates at each end of the piston concaved toward the adjacent end thereof, studs on said plates adapted to contact with adjacent plates, a covering of rubber molded about said plates between said studs, longitudinally extending lips on the endmost of said plates and means to clamp said plates upon said rod.

7. A piston including end plates dished to present a concave face toward the ends thereof, a spacing plate of smaller diameter between said end plates, studs on said end plates and a layer of rubber between said studs and about the peripheries of said end plates to contact with the cylinder walls and form a seal therewith.

8. A piston including end plates dished to present a concave face toward the ends thereof, a spacing plate of smaller diameter between said end plates, studs on said end plates and a layer of rubber between said studs and about the peripheries of said end plates to contact with the cylinder walls and form a seal therewith and means to clamp said plates rigidly to a piston rod.

9. A pump piston including in combination a plurality of interfitting saucer shaped discs, and means to retain said discs on the piston rod.

10. A pump piston made up of a plurality of saucer shaped discs, each disc including a rigid reenforcing plate, and resilient material carried thereby.

11. An article of manufacture comprising a convexo-concave plate, a central opening in said plate, and a plurality of outstanding bosses thereon.

12. An article of manufacture comprising a convexo-concave plate, a central opening in said plate, a plurality of outstanding bosses thereon, and a body of rubber molded about said bosses.

13. A disc adapted to form one element of a pump piston and including a plate of metal, a body of rubber molded about said plate and formed to present a sealing periphery to the cylinder liner.

14. A piston including convexo-concave discs assembled on the piston rod back to back, and a concavo-concave spacing ring between said discs.

In testimony whereof I hereunto affix my signature this 17th day of September, A. D. 1929.

HERBERT W. MILLMINE.